United States Patent
Hill et al.

(10) Patent No.: US 7,571,123 B1
(45) Date of Patent: Aug. 4, 2009

(54) WEB SERVICES MANAGEMENT ARCHITECTURE

(75) Inventors: B. Martin Hill, Lancaster, TX (US); Vijaykumar Musuvathy, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 567 days.

(21) Appl. No.: 11/409,191

(22) Filed: Apr. 21, 2006

(51) Int. Cl.
*G06Q 30/00* (2006.01)

(52) U.S. Cl. ...................................... 705/26

(58) Field of Classification Search .............. 705/26, 705/27
See application file for complete search history.

(56) References Cited

U.S. PATENT DOCUMENTS

| | | | |
|---|---|---|---|
| 6,009,410 A | * | 12/1999 | LeMole et al. ............... 705/14 |
| 2002/0013827 A1 | * | 1/2002 | Edstrom et al. ............. 709/219 |
| 2006/0294084 A1 | * | 12/2006 | Patel et al. ..................... 707/3 |

OTHER PUBLICATIONS

John Walsh, National Post, Don Mills, Ont: Aug. 7, 2001, p. M8; http://proquest.umi.com/pqdweb?did=245421531&sid=4&Fmt=3 &clientId=19649&RQT=309&VName=PQD.*

* cited by examiner

*Primary Examiner*—Jeffrey A. Smith
*Assistant Examiner*—Mila Airapetian

(57) ABSTRACT

A system for web services management is provided. The system includes a plurality of web services, a catalog of business services, and an orchestration service. Each business service corresponds to one or more web services. The orchestration service can invoke an appropriate web service when a business service is selected from the catalog.

16 Claims, 3 Drawing Sheets

WEB SERVICES MANAGEMENT ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to web services, and more particularly, but not by way of limitation, to a system and method for facilitating the use of an enterprise's internal web services by an external customer.

BACKGROUND OF THE INVENTION

The term web services can refer to services that a service provider makes available to customers or applications via the world wide web. Examples of services that might be provided include the ability of a customer or application to enter an order, the ability to check on the status of an order, the ability to manage customer account information, the ability to create and manage trouble tickets, and the ability to manage billing information.

Prior to the introduction of web services, such services would typically be performed manually. For example, if a customer wished to check on the status of an order, the customer might telephone an account manager at the company with which the order was placed. The customer would inform the account manager of the information that was requested and the account manager might relay the request to an internal group appropriate for the type of request. The internal group might then manually retrieve the requested information and return the information to the account manager, who would then provide the information to the customer.

The use of web services can allow such a request to be handled in an automated fashion. An application executing on a customer's computer system might automatically send an order status request, for example, to a service provider's computer system. The request might be sent via well-known protocols such as XML, UDDI, or SOAP. Upon receiving the request, the service provider's computer system might automatically retrieve the appropriate information and return it to the customer's computer system. A custom application programming interface (API) might be created to allow communication between the two computing systems.

SUMMARY OF THE INVENTION

An embodiment of the present disclosure provides a system for web services management. The system includes a plurality of web services, a catalog of business services, and an orchestration service. Each business service corresponds to one or more web services. The orchestration service can invoke an appropriate web service when a business service is selected from the catalog.

In another embodiment, a method for managing web services is provided. The method includes providing a catalog of business services, wherein each business service corresponds to one or more web services; selecting a business service from the catalog; and performing a web service corresponding to the selected business service.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
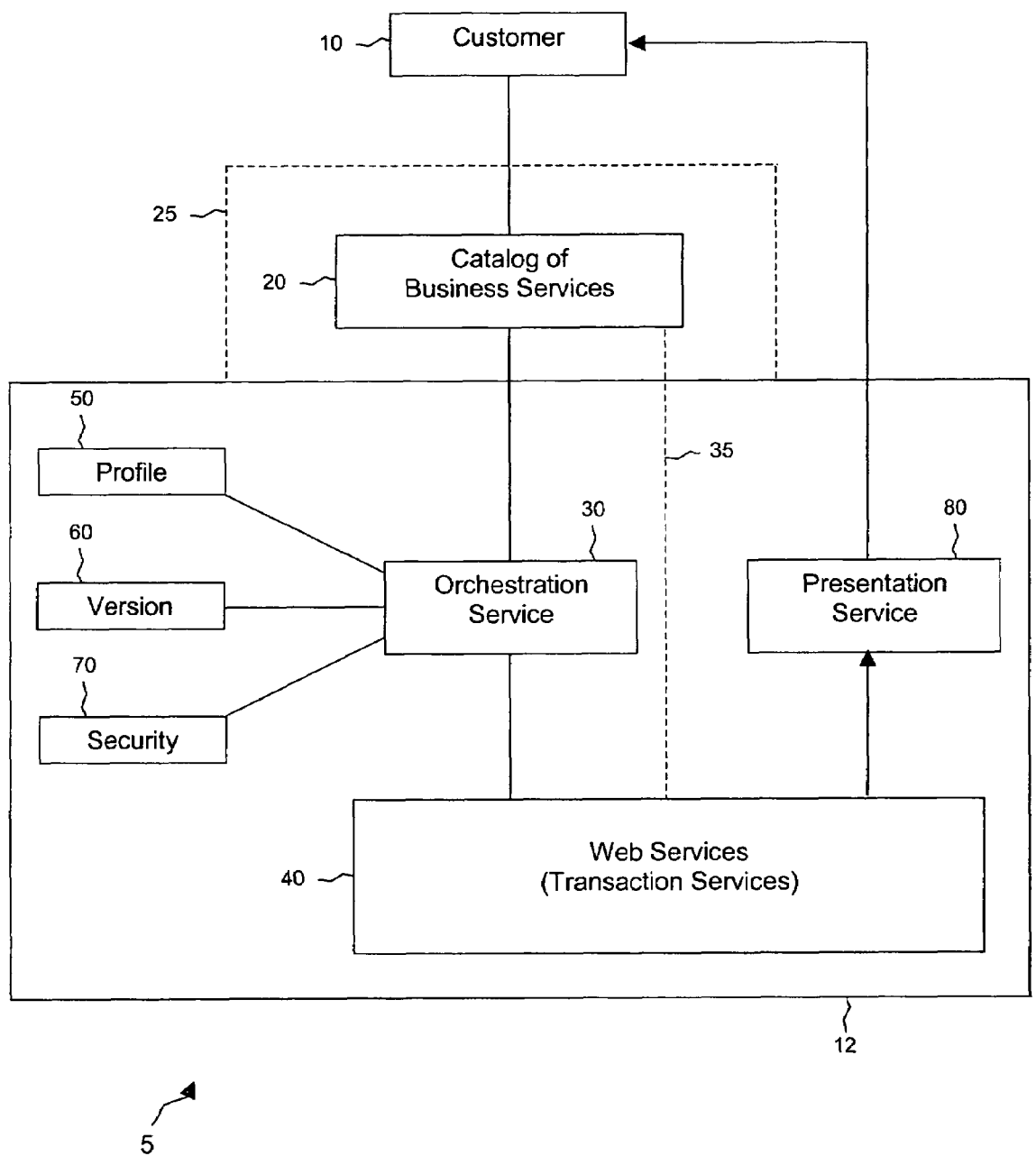
FIG. 1 illustrates a web services management system according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Under the prior art, a customer wishing to make use of a web service might update an API in its internal computing systems with an appropriate web services request. The API might be capable of mediating communication with the computing systems of the enterprise to which the web services request is being sent, so that updating the customer's API causes a corresponding update in the enterprise's computing systems. Upon receipt of a web services request in this manner, the enterprise's front end computing systems can communicate with its back end computing systems to cause the back end systems to perform the actions needed to fulfill the request. The back end systems might return information to the front end systems, which then return the information to the customer.

Previously, an enterprise offering web services might provide its customers with a different API for each different type of web services request a customer might make. For example, one type of API might be used for order entry requests, another type of API might be used for order status requests, etc. In addition, the APIs might need to be customized for each customer. Prior to providing an API, the enterprise might meet with a customer, determine the customer's requirements that might be met through the use of web services, develop a set of custom APIs for the customer to use when making web services requests, provide the APIs to the customer, and ask the customer to use the APIs when making web services requests.

The customization of APIs based on web service request type and on customer needs can result in a large number of different APIs. Each different API might require a different type of interaction with a customer. For example, even though each API is customized, each customer may need to perform additional customizations to allow the API to interact with its computing systems. Each customer might also need to enter identification information and other data into the API with each web services request.

In embodiments of the present disclosure, one or more web services provided by an enterprise are represented by a business service. A customer of the enterprise is provided with a catalog of business services from which a business service desired by the customer can be selected. Selection of a business service can cause one or more web services to be carried out. A one-to-one correspondence may exist between a business service visible through the catalog and a web service maintained by the enterprise. Alternatively, a single business service might be an aggregation of multiple web services.

In an embodiment, an orchestration service mediates communication between the catalog and the web services. The orchestration service has access to profile, version, and security information related to the customer and the customer's business services requests. The profile information allows customer-specific data to be stored so that the customer is not required to re-enter the data with each business service request. The version information allows the customer to choose from a plurality of versions of the business services. The security information ensures that the customer is authorized to access a selected web service.

When one or more web services returns data to a customer, the data might first pass through a presentation service. The presentation service can aggregate data from disparate web services into a single data presentation. The presentation service can also present the data to the customer in a format specified by the customer.

Such a web services management system can allow an enterprise to take on new users of web services and manage existing users with little or no involvement from an IT group. The need for an enterprise to provide multiple customized APIs for multiple different web services can be reduced or eliminated.

FIG. 1 illustrates a system 5 for web services management. A customer 10 has access to a catalog 20 of business services. The customer 10 may be a company that is a client of the enterprise providing the web services 40 represented by the business services or may be one or more of the computing systems of such a company. The catalog 20 might take the form of a list of business services appearing in a graphical user interface of a computing system maintained by the customer 10.

In some embodiments, the logic that makes the catalog 20 appear resides entirely within the computing system 12 of the enterprise providing the web services 40. In other embodiments, a portion of the logic that makes the catalog 20 appear resides in the computing systems of the customer 10 or elsewhere. This is illustrated by the dashed line 25 in FIG. 1, which indicates that all of portions of the catalog 20 may reside within the enterprise computing system 12. The enterprise computing system 12 may be a portion of the overall computing system used by a telecommunications company or other enterprise.

Each business service listed in the catalog 20 might correspond to one or more web services 40. For example, a telecommunications company might provide one web service 40 that allows its customers 10 to check on the status of frame relay orders and another web service 40 that allows its customers 10 to check on the status of ATM orders. One business service might correspond to the frame relay order status web service 40 and another business service might correspond to the ATM order status web service 40. Alternatively, a single business service might correspond to both the frame relay order status web service 40 and the ATM order status web service 40.

A customer 10 can browse through the catalog 20 and select a business service. To assist the customer 10 in selecting an appropriate business service, the catalog 20 might include descriptions of the business services that the enterprise computing system 12 makes available. The selection of a business service causes the invocation of one or more web services 40. Continuing the above example, a customer 10 that places both frame relay orders and ATM orders might see a generic "order status" business service listed in the catalog 20. Selection of this order status business service might cause the invocation of both the frame relay order status web service 40 and the ATM order status web service 40.

When a customer 10 uses the catalog 20 to request that a business service be carried out, the request, in some embodiments, passes through an orchestration service 30. The orchestration service 30 then determines which web service 40 or web services 40 will be invoked to carry out the business service request. In other embodiments, the orchestration service 30 may be bypassed, as indicated by the dashed line 35 in FIG. 1. In these embodiments, the selection of a business service directly invokes a web service 40 without making use of the services provided by the orchestration service 30.

If more than one web service 40 needs to be invoked to fulfill a business service request, the orchestration service 30 can determine the proper sequence in which the web services 40 should be invoked. For example, a business service might invoke an order status web service 40 and then, if the order status indicates that the order has not been filled by an agreed upon date, the business service might invoke a trouble ticket web service 40. The orchestration service 30 can ensure that the order status web service 40 is invoked first and can then invoke the trouble ticket web service 40 if necessary.

In an embodiment, the orchestration service 30 uses a profile component 50, a version component 60, and a security component 70 to determine which web services 40 to invoke, the manner in which the web services 40 are to be invoked, and the information that might be included in an invocation. The profile component 50 maintains a profile for each customer 10 that might use the catalog 20 of business services. Each customer 10 might make use of a different set of business services and underlying web services 40. The profile can maintain information about the business services that are used by each customer 10. Thus, each customer 10 might see a different list of business services in the catalog 20 based on each customer's profile. A profile might also include contractual commitments, such as service level agreements, between an enterprise and a customer 10.

The profile information contained in the profile component 50 can also be used to assist customers 10 in placing orders. For example, the enterprise that maintains the web services 40 might supply consumer products to multiple customers 10 that maintain retail stores. A particular customer 10 might operate multiple retail stores in multiple geographic locations. The customer's profile might contain information about purchasing trends, inventory levels, contract expiration dates, and other information for the enterprise's products and services sold at each of the customer's stores. When a particular store places an order via the catalog 20, the orchestration service 30 can retrieve profile information for that store from the profile component 50 and inform the customer 10 of products with low inventory levels, products that are more likely to be purchased, and other information that might impact the content of the order.

A business service listed in the catalog 20 might be a generic service available for use by different customers 10. For example, all customers 10 might use the same order status business service. Alternatively, a generic business service might be customized for different customers 10 so that the custom business service versions have different or additional attributes included with the attributes that are available in the generic version of a business service. For example, each customer 10 might use a slightly different version of the order status business service or some customers 10 might use the generic order status business service and other customers 10 might use a custom order status business service.

A single customer 10 might also want different versions of a business service to be available to different internal entities, such as departments or geographic regions. For example, an older version of a business service with only limited capabilities might be available to internal entities that use older computing systems and a newer version of that business service with enhanced capabilities might be available to internal entities that use newer computing systems. The version component 60 maintains information about the different versions of business services used by different customers 10 and by different entities internal to a customer 10.

A customer 10 browsing the catalog 20 of business services might see only the version or versions of the business services that pertain to that customer 10. Other versions of the same business service that pertain to other customers would be invisible. For example, a customer 10 might use a generic version of a business service in most circumstances and a custom version of that business service in special circumstances. The customer 10 might see both versions of the business service in the catalog 20 and might select the version that is appropriate for the circumstances.

In an embodiment, the orchestration service 30 uses profile information in the profile component 50 to determine which version of a business service to use for a customer 10. That is, each customer's profile may specify which versions of a business service are to be provided to the customer 10 under which circumstances. For example, the profile component 50 might specify that an older version of a business service will be provided when the customer 10 is using an older computing system and that a newer version of a business service will be provided when the customer 10 is using a newer computing system. By consulting the profile component 50, the orchestration service 30 can ensure that the appropriate version of a business service is listed in the catalog 20 each time a customer 10 browses the catalog 20. The maintenance of version information in the profile component 50 eliminates the need for the customer 10 to specify the version of a business service that the customer 10 wishes to use.

As an example, a particular customer 10 might select from the catalog 20 a business service called "order status". The orchestration service 30 would then retrieve that customer's profile from the profile component 50. The profile might include information about the customer's location, preferences, previous orders, and other data that might be pertinent to the business service request. The orchestration service 30 might then combine the business service request with the profile information into what can be referred to as the context of the request. The orchestration service 30 might then use the context to determine which web service 40 or web services 40 to invoke to fulfill the business service request.

If more than one web service 40 is invoked, the orchestration service 30 might aggregate the results of the plurality of web service invocations to produce a single result that is returned to the customer 10. Alternatively, as described below, a presentation service 80 might perform this aggregation. In this way, a single order status request can return the status of all orders a customer 10 might have placed, even when multiple web services 40 need to be invoked to retrieve information about different types of orders. This can significantly decrease the application development work that would otherwise need to be done by the customer 10 since the customer 10 only needs to complete the profile and then select an appropriate business service to invoke. The web services management system 5 can then invoke the appropriate web services 40.

The orchestration service 30 can consult the security component 70 to determine whether a customer 10 is authorized to gain access to the web services 40 associated with a selected business service. When a customer 10 uses multiple profiles, the security component 70 might determine which profile is used on which occasion. The security component 70 might also enforce privacy rules such as government regulations regarding access to customer data. In an embodiment, the security component 70 might make use of commercial, off-the-shelf security applications, such as Identity Minder or Site Minder, that are already deployed by the enterprise maintaining the web services 40.

In addition to managing profile, version, and security information, the orchestration service 30 might perform other functions. For example, the orchestration service 30 might re-launch a failed request for a business service. The orchestration service 30 might also conduct monitoring of the business requests for quality assurance and/or trending purposes. The orchestration service 30 might also provide reports of business service-related transactions.

The orchestration service 30 fulfills requests for business services by accessing the appropriate web services 40, which might also be referred to as transaction services. In an embodiment, the web services 40 are equivalent to the web services that an enterprise might use if the web services management system 5 were not in place. That is, an enterprise might make its previously existing web services 40 available to customers 10 via the catalog 20. The catalog 20 and the orchestration service 30 allow customers 10 to use the web services 40 without needing to know operational details of the web services 40. Customers 10 need to do little or no API programming or other customization to use the web services 40.

When a request for a business service results in a web service 40 returning data to a customer 10, the data might first pass through a presentation service 80. The presentation service 80 can aggregate data from disparate web services 40 into a single presentation in a format specified by the customer 10. For example, one customer 10 might wish to receive data in a spreadsheet, while another customer 10 might want data in an XML format. Customers 10 can inform the presentation service 80 one time of the format in which they would like to receive data and the presentation service 80 can thereafter provide the data in the specified format. The profile component 50 might maintain these format preferences.

Figure 2:
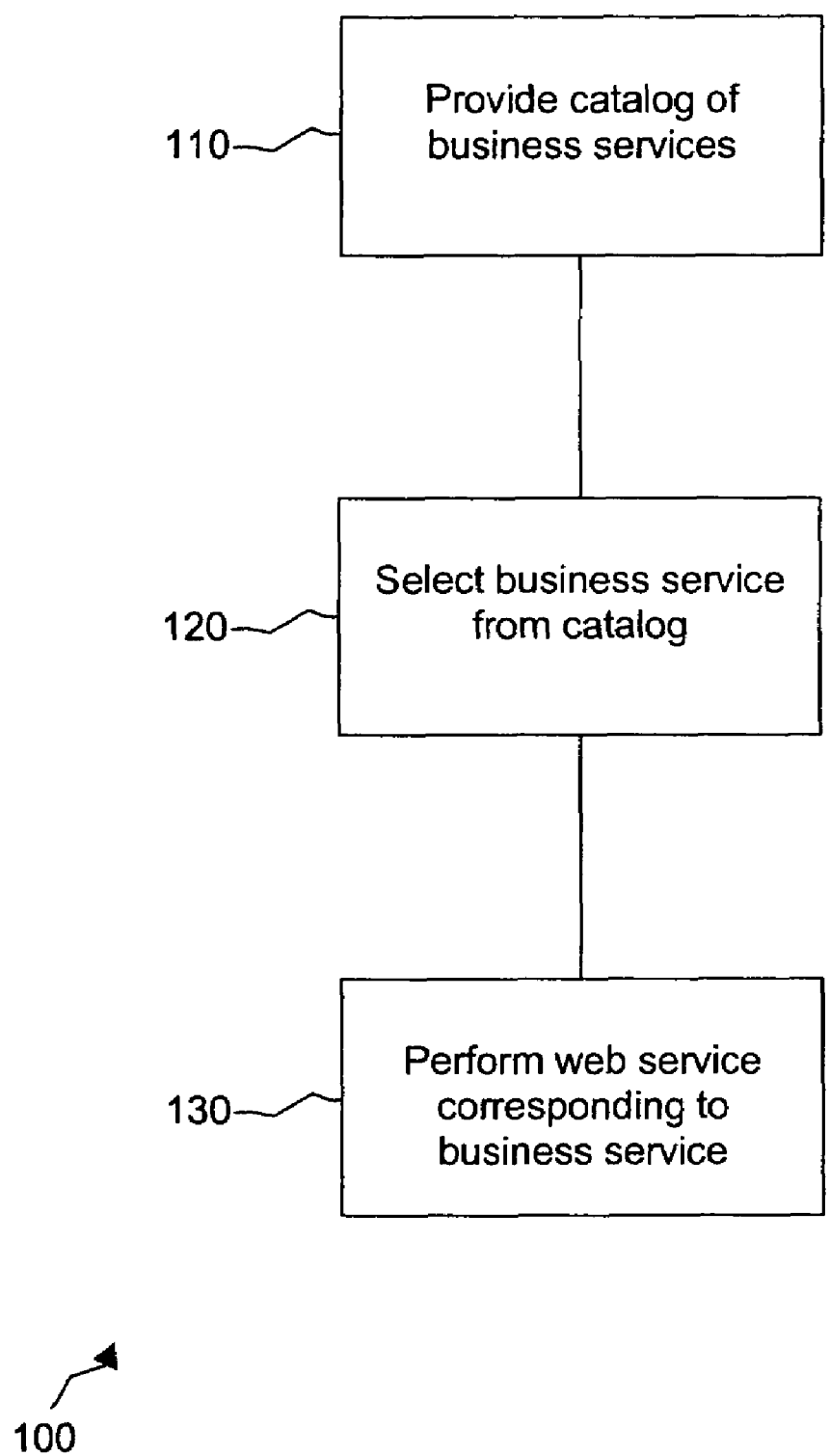
FIG. 2 is a flow chart of a method for managing web services according to one embodiment of the present disclosure.

FIG. 2 illustrates a method 100 for managing web services. In box 110, a catalog 20 of business services is made available to customers 10. Each business service corresponds to one or more web services. In box 120, a customer 10 selects from the catalog 20 a business service that the customer 10 wishes to have performed. In box 130, one or more web services corresponding to the selected business service are carried out.

Figure 3:
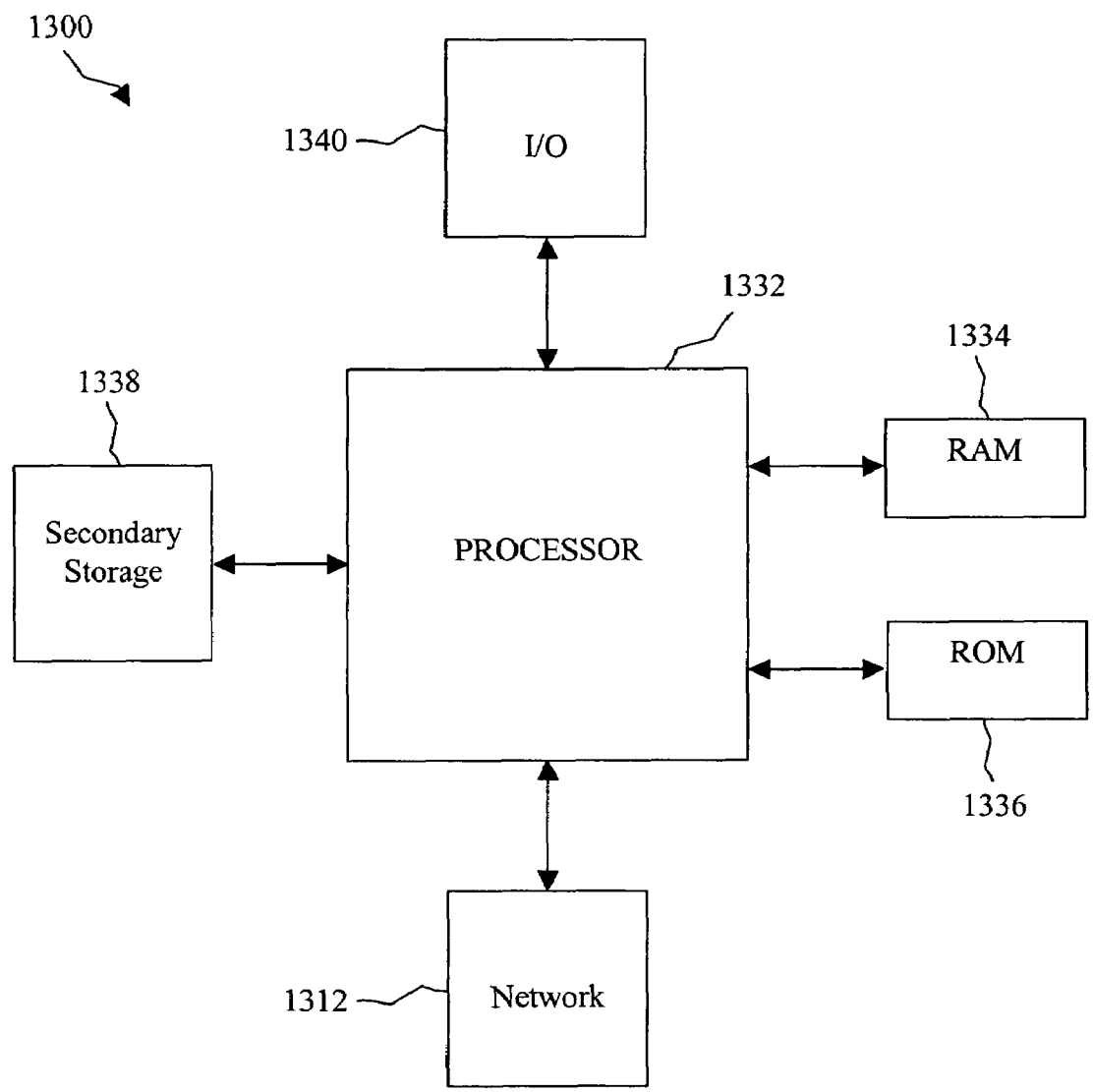
FIG. 3 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for web services management, comprising:
    a computer readable medium storing a catalog of business services, wherein each business service corresponds to one or more web services of a plurality of web services;
    a computer readable medium storing an orchestration service operable by a processor to invoke an appropriate web service when a business service is selected from the catalog; and
    a computer readable medium storing a profile component operable by a processor to allow a first set of business services to be displayed in the catalog for a first customer and a second set of business services to be displayed in the catalog for a second customer, wherein the profile component is further operable to maintain information related to order entry, wherein information maintained in the profile component is combined with information related to a business service to create a context, and wherein the orchestration service uses the context to determine an appropriate web service to invoke when the business service associated with the context is selected from the catalog.

2. The system of claim 1, further comprising a computer readable medium storing a version component operable to allow a first version of a business service to be displayed in the catalog for a first customer and a second version of the business service to be displayed in the catalog for a second customer.

3. The system of claim 2, wherein the version component is further operable to allow a generic version of a business service and a customized version of the business service to be displayed in the catalog.

4. The system of claim 1, further comprising a computer readable medium storing a security component operable to determine whether a customer is authorized to gain access to a web service associated with a selected business service.

5. The system of claim 4, wherein the security component is further operable to determine which of a plurality of profiles is to be used for a customer.

6. The system of claim 1, further comprising a computer readable medium storing a presentation component operable to display data returned from a web service in a format specified by a customer.

7. A computer-implemented method for managing web services, the computer-implemented method comprising:
providing to a processor a catalog of business services stored on a computer readable storage medium, wherein each business service in the catalog corresponds to one or more web services;
selecting, with a processor, a business service from the catalog;
performing, with a processor, a web service corresponding to the selected business service;
causing, with a processor, an orchestration service to invoke an appropriate web service based on the selected business service;
causing, with a processor, a profile component to display in the catalog a first set of business services for a first customer and to display a second set of business services for a second customer, wherein the profile component maintaining information related to order entry;
combining, with a processor, the information maintained in the profile component with information related to a business service to create a context; and
using, with the orchestration service, the context to determine an appropriate web service to invoke when the business service associated with the context is selected from the catalog.

8. The method of claim 7, further comprising a version component causing a first version of a business service to be displayed in the catalog for a first customer and a second version of the business service to be displayed in the catalog for a second customer.

9. The method of claim 8, further comprising the version component causing a generic version of a business service and a customized version of the business service to be displayed in the catalog.

10. The method of claim 7, further comprising a security component determining whether a customer is authorized to gain access to a web service associated with a selected business service.

11. The method of claim 10, further comprising the security component determining which of a plurality of profiles is to be used for a customer.

12. The method of claim 7, further comprising a presentation component displaying data returned from a web service in a format specified by a customer.

13. The system of claim 1 wherein selection of a second business service bypasses the orchestration service and wherein selection of the second business service directly invokes web services corresponding to the second business service.

14. The system of claim 1 wherein the orchestration service can determine a proper sequence in which web services should be invoked.

15. The method of claim 7 further comprising:
selecting a second business service, wherein selecting the second business service bypasses the orchestration service, and wherein selection of the second business service directly invokes web services corresponding to the second business service.

16. The method of claim 7 further comprising:
determining, with the orchestration service, a proper sequence in which web services should be invoked.

* * * * *